United States Patent
Cha

(12) 
(10) Patent No.: US 6,240,520 B1
(45) Date of Patent: May 29, 2001

(54) POWER ON/OFF CONTROL DEVICE FOR COMPUTER

(75) Inventor: Kyoung Hwan Cha, Seoul (KR)

(73) Assignee: Daewoo Telecom Ltd., Incheon (KR)

( * ) Notice: Subject to any disclaimer, the term of this patent is extended or adjusted under 35 U.S.C. 154(b) by 0 days.

(21) Appl. No.: 09/093,830

(22) Filed: May 12, 1998

(30) Foreign Application Priority Data

May 13, 1997 (KR) .................................................. 97-18565

(51) Int. Cl.$^7$ ...................................................... G06F 1/26
(52) U.S. Cl. .......................................... 713/310; 713/300
(58) Field of Search .................................. 713/300–340

(56) References Cited

U.S. PATENT DOCUMENTS

| | | | |
|---|---|---|---|
| 4,749,991 | * 6/1988 | Davis et al. ..................... | 340/825.31 |
| 5,276,865 | * 1/1994 | Thorpe ................................... | 714/24 |
| 5,339,446 | * 8/1994 | Yamasaki et al. ................... | 713/340 |
| 5,513,359 | * 4/1996 | Clark et al. .......................... | 713/323 |
| 5,530,878 | * 6/1996 | Bauer et al. ......................... | 713/310 |
| 5,530,879 | * 6/1996 | Crump et al. ........................ | 713/323 |
| 5,815,409 | * 9/1998 | Lee et al. ......................... | 364/528.21 |
| 5,838,982 | * 11/1998 | Cooper et al. ....................... | 713/300 |
| 5,845,134 | * 12/1998 | Arai ..................................... | 713/322 |
| 5,987,613 | * 11/1999 | Busch et al. .......................... | 713/300 |

* cited by examiner

*Primary Examiner*—Sumati Lefkowitz
(74) *Attorney, Agent, or Firm*—Lilling & Lilling P.C.

(57) ABSTRACT

A power on/off control device having a first power supply outputs a predetermined first electric power upon receiving input power and a second power supply outputs a main electric power to operate the computer upon power-on, which is turned on and off according to power driving signals of a first level or a second level. A power switch outputs a first level while the power switch is being pressed down, and a second level while not pressed down. A power driving signal output outputs power driving signals of the first level or of the second level alternatively according to inputted pulse signals from a microprocessor, the microprocessor has a first port connected with the power switch and a second port coupled with the power driving signal output, for controlling power on/off according to signal levels from the first port and the second port. A data output forwards data outputted from the microprocessor to a system data bus. A data input sends data inputted through the system data bus to the microprocessor. The microprocessor detects on/off status of computer according to signal levels inputted through the second port and outputs pulse signals to the power driving output according to the signal levels from the power switch and command data from the data input.

7 Claims, 5 Drawing Sheets

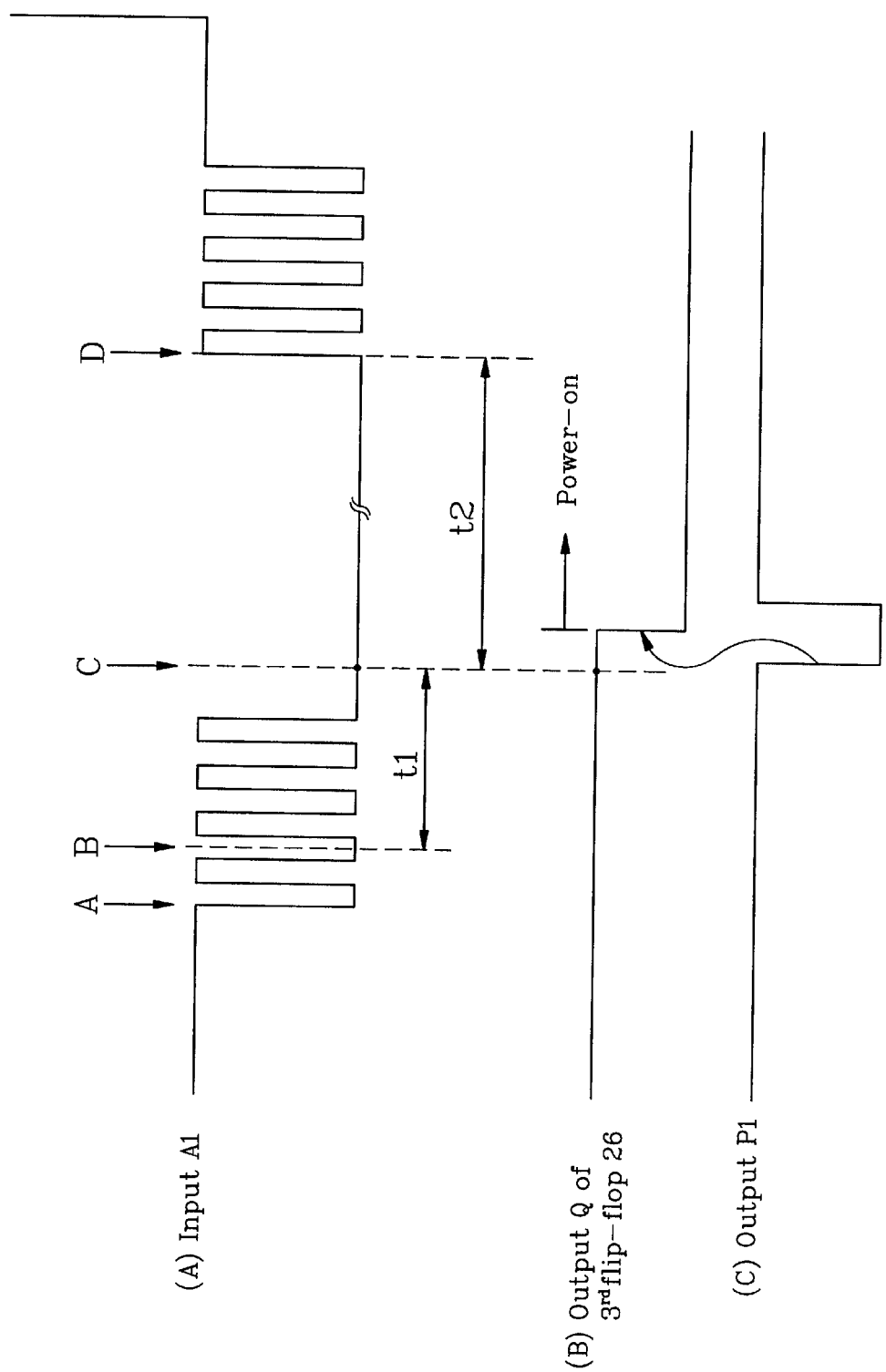

POWER ON/OFF CONTROL DEVICE FOR COMPUTER

BACKGROUND OF THE INVENTION

1. Field of the Invention

The present invention relates to a power on/off control device for a personal computer, specifically relates to a power on/off control device for computer capable of preventing a loss of data being in process, due to a sudden power-off caused by making a mistake of operating.

2. Discussion of Related Art

As computer techniques have been developed rapidly, especially in terms of function and speed for processing, a personal computer is widely being used as a communication terminal, and being developed to use as a central equipment for a home automation, whereas the conventional personal computer has been used simply as a word processor or as a data processor.

As the conventional computer is turned on and turned off only by operating of a mechanical power switch, it cannot accommodate with various user environments and, in fact, data being processed used to be lost by making a mistake of operating a power switch in the middle of working.

Thus, the applicant of the present invention has proposed a power on/off control device for computer for controlling the power on/off of a computer, especially controlling the power-off by operating a software function.

FIG. 1 shows a configuration of the power on/off control device for computer, disclosed in U.S. patent application Ser. No. 08/749,027. In the figure, reference numeral 1 denotes a power plug, numeral 2 a standby power source for outputting standby power Vs:5V needed when standby mode, based on input power from the power plug 1, and number 3 a switching mode power supply (SMPS), operated according to power control signal $\overline{PWR}$ received from a RTC 4, hereinafter described, for generating variable operating voltages V1 to V4, based on the input power from the power plug 1.

And reference symbol SW1 denotes an on/off switch, installed outside the computer, for turning a computer on and off mechanically by user, of which one end is grounded and the other end is connected to one end of an AND gate AND1 through a pull-up resistor R1. And the other end of the AND gate AND1 is connected with an infrared receiver, not depicted.

Here, the infrared receiver, which is a usual one for turning on and off a computer by receiving user's infrared command through a remote controller, outputs, for example, low level signal for a predetermined time, if a user inputs infrared signal to turn on the computer through the remote controller. That is, the AND gate AND1 outputs power-on signal of low level for a corresponding time, while the user is operating the remote controller or the on/off switch SW1 to turn on the computer.

Reference numeral 4 denotes a real time clock RTC, in which a kick start signal input port $\overline{KS}$ receives the output of the AND gate AND1 and a kick start signal output port $\overline{PWR}$ is connected to the SMPS 3 through a pull-up resistor R2. And the RTC 4 outputs power control signal of low level through the output port $\overline{PWR}$ at a falling edge of corresponding signals, for example, for a couple of seconds, when the signal inputted from the kick start signal input port $\overline{KS}$ turns to be low level, and then outputs power control signal of low level through the output port $\overline{PWR}$ till the output port $\overline{PWR}$ is set to high level by means of another power-off operation, that is, data obtained from a system data bus, when a normal voltage of +5V is outputted from the SMPS 3 which is operated normally by the power control signal of low level from the output port $\overline{PWR}$.

Besides, the RTC 4, including a status resistor, not depicted, for setting signal status inputted from the kick start signal input port $\overline{KS}$, sets a status flag, for example, to "1" at a falling edge of the signal inputted through the kick start signal input port $\overline{KS}$, the status flag can be read and reset through a system address bus and a system data bus.

Meantime, when the computer is turned on, a CPU, not depicted, resets the status flag "1" to "0", stored at the status resistor of the RTC 4, through the system address bus and the system data bus, and then detects whether the status flag is reset to "1". When the status flag is set to "1" again, the system data bus and the system address bus set the output of power control signal $\overline{PWR}$ of the RTC 4 to high level, thus suspending the operation of the SMPS 3. That is, in the above configuration, the power-off operation of the computer can be controlled by the CPU.

Accordingly, the above configuration provides various user environments, that is, confirming user's intention to turn off a computer when the user touches power switch, turning off the computer automatically after the computer remains alone for a predetermined time, and so on.

Meantime, as the power on/off control device for computer described above is designed to be turned off only by the CPU, it comes to be a problem that the computer can not be turned off through the power switch, in case that the CPU doesn't work by reason that the system is down, and so on.

SUMMARY OF THE INVENTION

Accordingly, the present invention is directed to a power on/off control device for computer, which substantially obviates one or more of the problems described above, capable of turning off the computer by operating a software power-off function and turning on and off by hand, mechanically as well.

To accomplish the object of the invention, a power on/off control device for computer, having a first power supply means for outputting predetermined first electric power upon receiving input power and a second power supply means for outputting main electric power to operate the computer being on power-on, which is turned on and off according to power driving signals of a first level or a second level, comprising: a power switch for outputting a first level while the power switch is being pressed down, and a second level while not pressed down; a power driving signal output means for outputting a power driving signal of the first level or of the second level alternatively according to pulse signals inputted from a microprocessor; a microprocessor, having a first port connected with the power switch and a second port coupled with the power driving signal output means, for controlling power on/off according to signal levels from the first port and the second port; a data output means for forwarding data outputted from the microprocessor to a system data bus; and a data input means for sending data inputted through the system data bus to the microprocessor, the microprocessor detects on/off status of computer according to level signals inputted through the second port and outputs pulse signals to the power driving output means according to the signal levels from the power switch and command data from the data input means.

Besides, the microprocessor outputs pulse signal to the power driving signal output means, in case that the first level signal is inputted from the power switch and at the same time the computer is being on power-off, outputs power-off signal through the data output means, in case that the first level signal is inputted from the power switch and at the same time the computer is being on power-on, and outputs pulse signal to the power driving signal output means according to power-off signal inputted through the data input means. Furthermore, the microprocessor outputs pulse signal to the power driving signal output means, in case that the first level signal is inputted from the power switch for a first predetermined time, when the computer is being on power-on.

In the above configuration according to the present invention, the computer can be turned off by means of transmitting command data through the data input means in the CPU, so it is possible to perform various program controls including turning off the computer, which is not in use, and so on.

Moreover, even when the user operates the power switch to turn off the computer, the computer isn't at once turned off by the operation of the power switch, but by a predetermined command data. So it is possible to prevent a loss of data being in process, due to a sudden power-off caused by making a mistake of operating the power switch, by confirming user's intention to turn off the computer when the user touches power switch.

And as the computer may be turned off when the user press the power switch for a predetermined time, it is possible to cope with sudden accidents such as system down.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 5 is a timing chart showing an operation of a microprocessor of FIG. 2.

DETAILED DESCRIPTION OF PREFERRED EMBODIMENT

Reference will now be made in detail to an embodiment of the present invention which is illustrated in the accompanying drawings.

Figure 2:
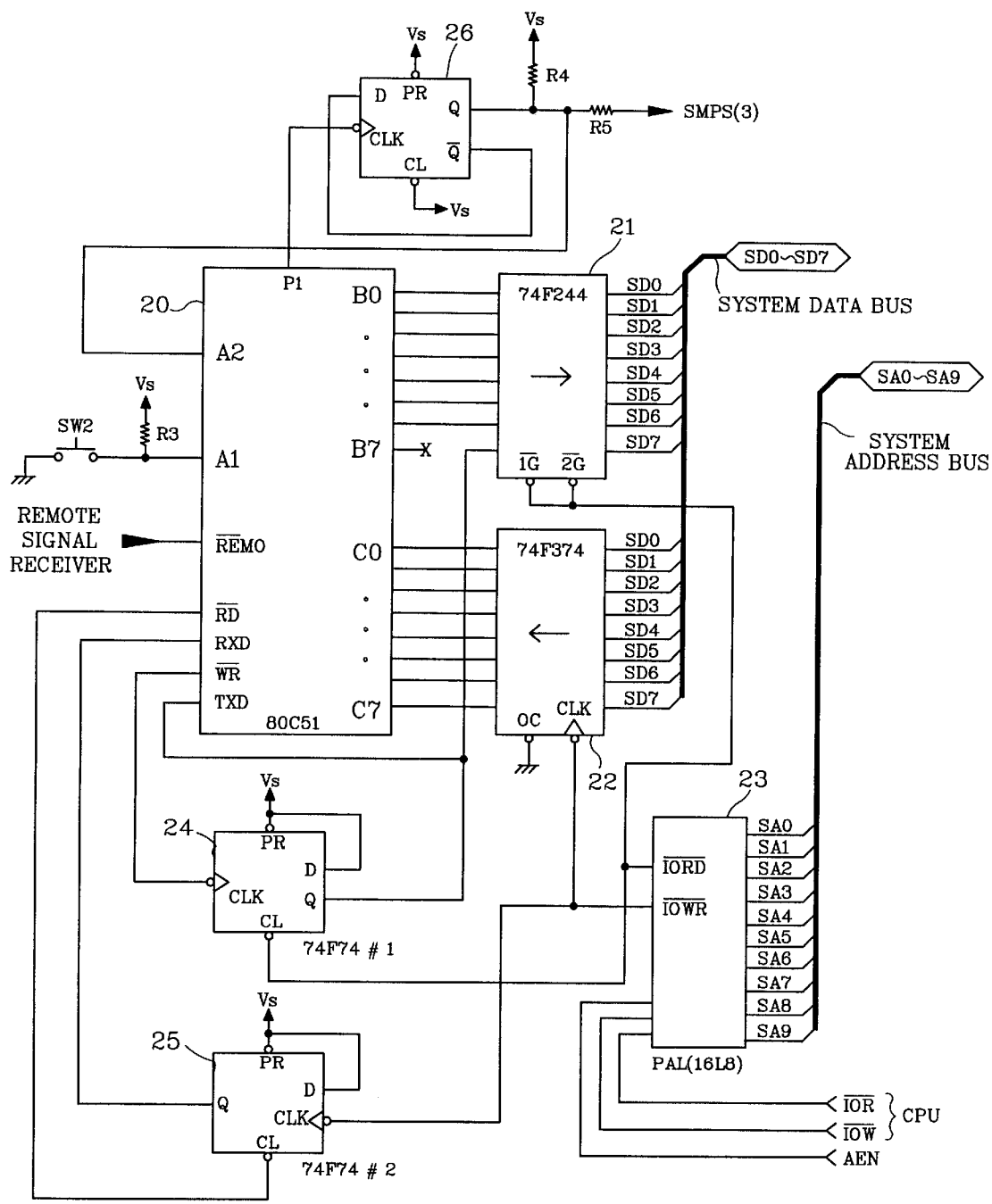
FIG. 2 shows a configuration of a power on/off control device for computer according to an embodiment of the present invention.

Referring to FIG. 2, a power switch SW2 is on only during being pressed down. Reference numeral 20 denotes a microprocessor, including an input port A1 connected with the power switch SW2 through a pull-up resistor R3 and a receiving port $\overline{REMO}$ for receiving remote signal forwarded from a remote controller, not depicted, the microprocessor 20 performs the power on/off operation according to the remote signal and on/off signal of the power switch SW2.

Reference numeral 21 denotes an output buffer, in which an input port is connected with a data output port B0 to B6 of the microprocessor 20 and with an output port Q of a first flip-flop 24, hereinafter described, and an output port is linked with a system data bus SD0 to SD7, coupling data from the output ports B0 to B6 of the microprocessor 20 and data from output port Q of the first flip-flop 24 with the system data bus SD0 to SD7, according to predetermined gate signals $\overline{1G}$ and $\overline{2G}$.

An input buffer 22, in which an input port is connected with the system data bus SD0 to SD7, and an output port is linked with an input port C0 to C7 of the microprocessor 20, latches on data of the system data bus SD0 to SD7 according to $\overline{IOWR}$ signal inputted into a clock signal input port CLK, to input it into the input port C0 to C7 of the microprocessor 20.

Programmable array logic (PAL) 23 outputs predetermined signals of $\overline{IORD}$ and $\overline{IOWR}$ according to address data of the system address bus SA0 to SA9, $\overline{IOR}$ and $\overline{IOW}$ signals from CPU, not depicted, and address enable signal AEN from a direct memory access controller. The $\overline{IORD}$ signal is accessed through gate ports $\overline{1G}$ and $\overline{2G}$ of the output gate 21 and a clear port $\overline{CL}$ of a first flip-flop 24, described hereinafter, and the $\overline{IOWR}$ signal is passed through the clock input port CLK of the input buffer 22 and a clock input port CLK of a second flip-flop 25, explained hereinafter.

The first flip-flop 24, in which an input D is connected with electric power voltage Vs, a clock input port CLK is coupled with an output of $\overline{WR}$ signal from the microprocessor 20 and an output Q is link with the output buffer 21 as an 8-bit input, is for generating an output flag depending on signal outputted from the microprocessor 20. That is, the first flip-flop 24 outputs an output flag "1" as an 8-bit data into the output buffer 21, when the microprocessor 20 outputs $\overline{WR}$ signal of "L" level.

The second flip-flop 25, in which an input D is connected with electric power voltage Vs, a clock input port CLK is coupled with an output of $\overline{IOWR}$ signal from the PAL 23 and an output Q is linked with a RXD port of the microprocessor 20, is for generating an input flag depending on the $\overline{IOWR}$ signal outputted from the PAL 23. That is, the second flip-flop outputs an input flag "1" into the microprocessor 20, when the PAL 23 outputs $\overline{IOWR}$ signal of "L" level.

The first and second flip-flop are cleared by the $\overline{IORD}$ signal of the PAL 23 and the RD signal of the microprocessor 20.

Figure 1:
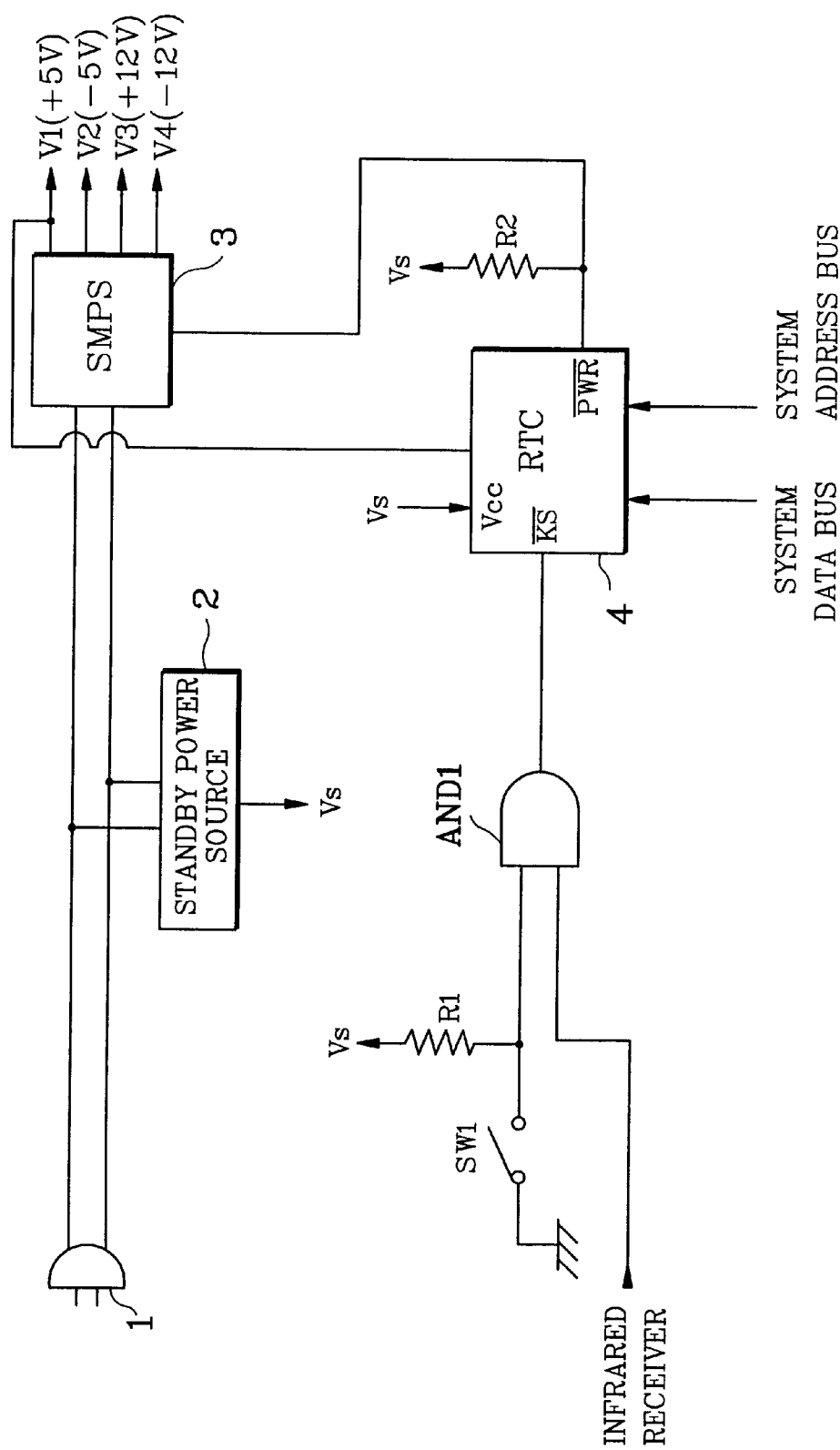
FIG. 1 shows a configuration of a conventional power on/off control device for computer.

Meanwhile, reference number 26 denotes a third flip-flop, for outputting power control signals "1" or "0" according to the control of the microprocessor 20, in which a clock input port (CLK) is connected with an output port P1 of the microprocessor 20 and an inverted output $\overline{Q}$ is linked with an input D therein, and an output port Q is supplied into the SMPS 3 of FIG. 1 through a pull-up resistor R4 and a bias resistor R5.

Accordingly, the third flip-flop 26 sets the SMPS 3 to be in operation or not in operation by outputting a power control signal "1" or "0" according to pulse signal of low level inputted from the microprocessor 20.

Furthermore, the microprocessor 20 determines whether the computer is turned on or turned off, based on level status of the input port A2 therein, since the output port Q of the third flip-flop 26 is linked with the input port A2 through the pull-up resistor R4.

Meanwhile, as the electric power voltage Vs is outputted from the standby power source 2 of FIG. 1, the respective circuities are operated, even when the computer is turned off.

Hereinafter, the description relates to the operation of a power on/off control device for computer as constructed as described above in accordance with the present invention.

Figure 3:
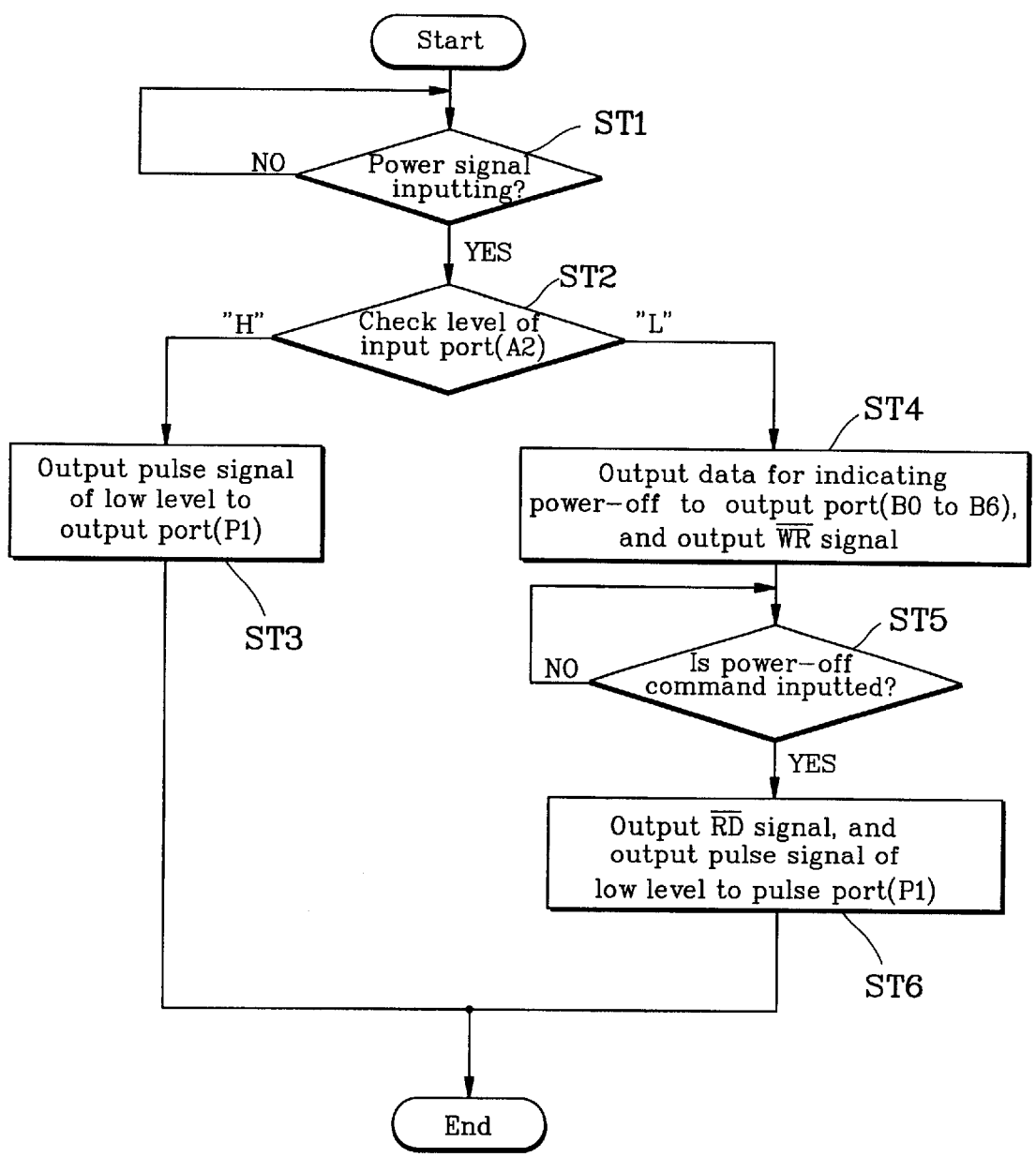
FIG. 3 is a flowchart explaining a power on/off operation using a remote controller of FIG. 2.

First of all, an operation of turning on and off with a remote control device is now described, referring to FIG. 3 showing a flowchart.

When power signal is inputted into the remote signal receiving port $\overline{\text{REMO}}$ of the microprocessor 20 as user operates power button of the remote controller (ST1), the microprocessor 20 determines whether the computer is being turned on or turned off by checking level of the input port A2 (ST2).

If the input port A2 is found to be "H" level, namely, where the SMPS 3 is not in operation and the computer is on power-off as the third flip-flop 26 outputs "H" level signal into the SMPS 3, the microprocessor 20 outputs pulse signal of "L" level through the output port P1 (ST3).

Here, the SMPS 3 turns to be in operation to turn on the computer as the output port Q of the third flip-flop 26 is set to "L" level by the output of pulse signal from the microprocessor 20.

And if the input port A2 is "L" level at the ST2, that is, where the SMPS 3 is in operation and the computer is on power-off as the output port Q of the third flip-flop 26 is set to "L", the microprocessor 20 outputs data, for indicating that the user input power-off signal, through the output port B0 to B6, and at the same time, sets the output flag to "1" by forwarding $\overline{\text{WR}}$ signal of "L" level to the clock input port CLK of the first flip-flop 24 (ST4).

Meanwhile, the CPU, not depicted, detects whether the output flag is set to "1" in the unit of a predetermined time, by gating the out buffer 21 through $\overline{\text{IORD}}$ signal and the system address bus SA0 to SA 9, and decodes data SD0 to SD7 inputted from the output buffer 21, when the output flag is set to "1". Here, the first flip-flop 24 is cleared by $\overline{\text{IORD}}$ signal outputted from the PAL 23.

In case that it is found, after decoding, that the user selected power-off, the CPU performs termination processes such as saving data being in process, confirming computer power-off, and so on, and then sets the output of $\overline{\text{IOWR}}$ signal of the PAL 23 to "L" level through the system address bus SA0 to SA 9 and $\overline{\text{IOW}}$ signal, and at the same time, outputs power-off command data through the system data bus SD0 to SD7. Accordingly, here, the power-off command data from the CPU is latched on the input buffer 22, and the input flag of "1" is forwarded from the second flip-flop 25 to the RXD port of the microprocessor 20.

Here, the microprocessor 20, received the input flag "1" as above, obtains command data from the input buffer 22 and outputs $\overline{\text{RD}}$ signal of "L" level to clear the second flip-flop 25.

However, the microprocessor 20 outputs pulse signal of low level through the output port P1 to set the output of the third flip-flop 26 to "H" level, if the command data inputted from the input buffer 22 is power-off command data.

Figure 4:
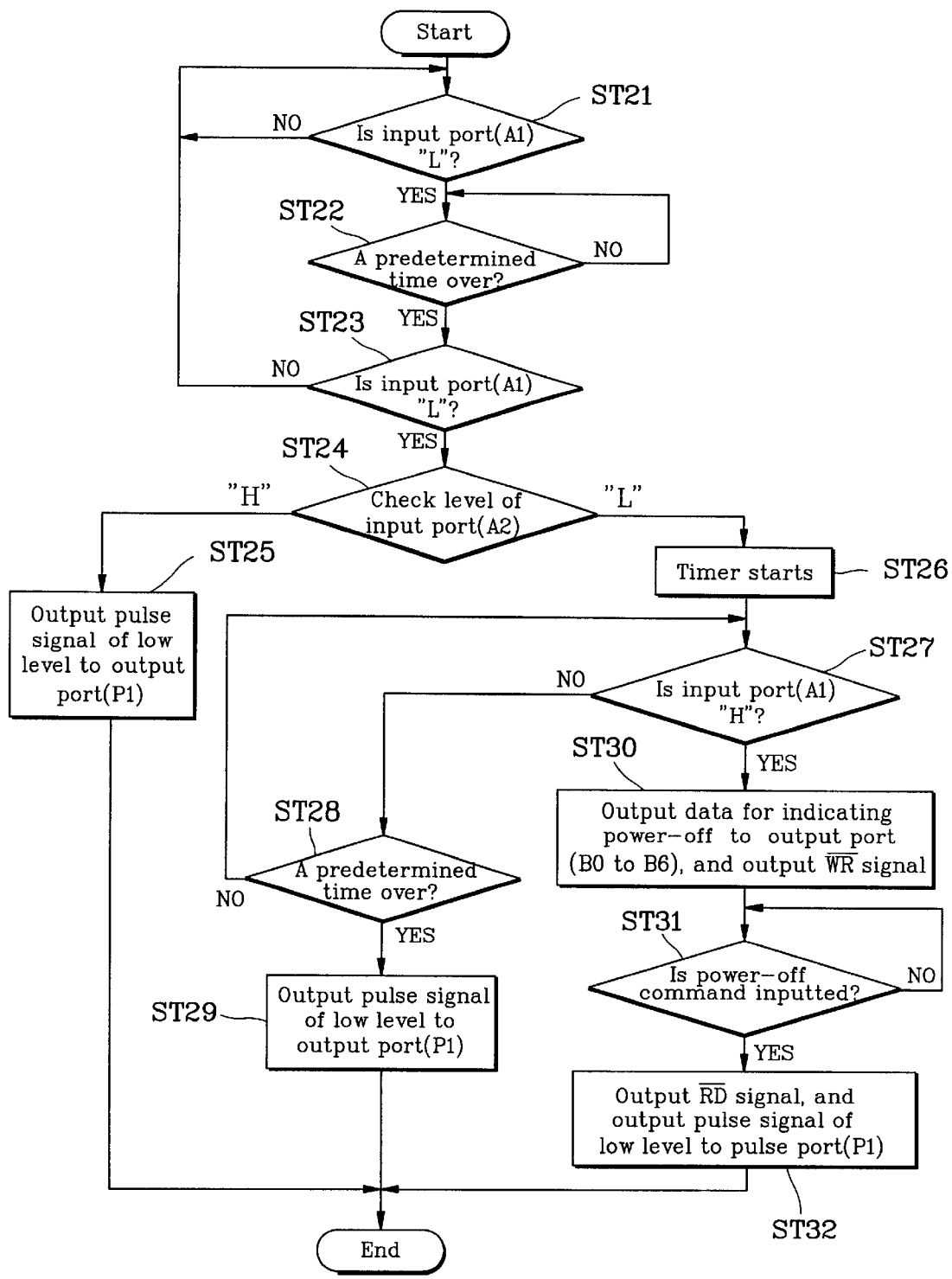
FIG. 4 is a flowchart illustrating a power on/off operation using a power switch of FIG. 2.

Herewith, an operation of turning on and off with power switch SW2 is now explained, making reference to FIG. 4 and FIG. 5.

When a user operates power switch SW2, operating signal based on the switch being operated is bouncing for a predetermined time as shown in FIG. 5A and then becomes stable. Thus, the device may operate abnormally by repetition of "H" and "L" of the switch signal, if the operation signal is detected while being bouncing.

According to the present invention, the microprocessor 20 counts a predetermined time, for example, 100 ms with a timer therein and double-checks the level of the input port A1 (ST22 and ST23), upon detecting low level of the input port A1 during polling operation (ST21). That is, where the user turns the power switch SW2 on at the point of A and the microprocessor 20 detects "L" level of the input port A1 at the point of B, the microprocessor 20 detects again the level of the input port A1 whether or not "L" level at the point of C after a predetermined time, t1, from the point of B.

If "L" level of the input port A1 is detected at the ST23, the microprocessor 20 determines whether the computer is on power-on or on power-off by checking the level of the input port A2 (ST24).

Then the microprocessor 20 outputs pulse signal of "L" level into the output port P1, when detecting "H" level of the input port A2 at the ST24, which means that the computer is being on power-off, as shown in FIG. 5B and FIG. 5C, thus setting the output port Q of the third flip-flop 26 to "L" level in a same way as described above (ST25).

In consequence, the computer is turned on as the SMPS 3 starts work.

Meanwhile, when detecting "L" level of the input port A2 at the ST24, which means that the computer is being on power-on, the microprocessor 20 counts a predetermined time with a timer therein and checks whether or not the level of the input port A1 increases to "H" (ST26, ST27).

And in case that the level of the input port A1 doesn't increase to "H" for a time counted by the timer, for example, 2-second, which means the user doesn't press down the power switch SW2 for more than 2-second, the microprocessor 20 outputs pulse signal of low level into the output port P1 to set the output port Q of the third flip-flop 26 to "H" level, thus turning off the computer (ST28 and ST29).

When the level of the input port A1 increases to "H" before a predetermined time counted by the timer at the ST27, that is, t2 time in FIG. 5A is less than, for example, 2-second, the microprocessor 20 outputs data, for indicating that the user input power-off signal, through the output port B0 to B6, and at the same time, outputs $\overline{\text{WR}}$ signal of "L" level to generate an output flag of "1" (ST30).

As shown in FIG. 3, if the power-off command is inputted through the input buffer 22 from the CPU (ST31), the microprocessor 20 outputs $\overline{\text{RD}}$ signal to reset the second flip-flop 25, that is, the input flag, and also outputs pulse signal of L" level into the output port P1, thus turning off the computer (ST32).

According to the embodiment described above, the user can turn on and off the computer using the power switch SW2 and the remote controller as well.

Besides, when the user turns off the computer using the power switch SW2 or the remote controller, the computer isn't turned off at once according to the user's switch operation, but turned off by operating a software power-off function in the CPU.

Accordingly, the above configuration provides various user environments, that is, capable of preventing a loss of data being in process, due to a sudden power-off caused by making a mistake of operating power switch or remote controller, and of confirming user's intention to turn off the computer, and so on.

Furthermore, in the above configuration, when the user presses down the power switch SW2 for a predetermined time, the microprocessor 20 performs power-off function at once. So it is possible to turn off the computer easily, even when the computer is down, caused by making a mistake of operation keyboard, or by its abnormality.

Moreover, in the above configuration, the CPU can turn off the computer only by inputting power-off command into the microprocessor 20 through the system data bus and the system address bus.

Therefore, it is possible to apply the embodiment according to the present invention to various computer environments available.

It will be apparent to those skilled in the art that various modifications and variations can be made in the power on/off control device for computer of the present invention without departing from the spirit or scope of the invention. Thus, it is intended that the present invention cover the modifications and variations of this invention provided they come within the scope of the appended claims and their equivalents.

What is claimed is:

1. A power on/off control device for computer, having a first power supply means for outputting predetermined first electric power upon receiving input power and a second power supply means for outputting main electric power to operate the computer being on power-on, which is turned on and off according to power driving signals of a first level or a second level, comprising:

a power switch for outputting a first level while the power switch is being pressed down, and a second level while not pressed down;

a power driving signal output means for outputting a power driving signal of the first level or of the second level alternatively according to pulse signals inputted from a microprocessor;

said microprocessor, having a first port connected with the power switch and a second port coupled with the power driving signal output means, for controlling power on/off according to signal levels from the first port and the second port;

a data output means for forwarding data outputted from the microprocessor to a system data bus; and a data input means for sending data inputted through the system data bus to the microprocessor, the microprocessor detects on/off status of computer according to signal levels inputted through the second port and outputs pulse signals to the power driving output means according to the signal levels from the power switch and command data from the data input means.

2. The power on/off control device for computer as claimed in claim 1, wherein the microprocessor outputs pulse signal to the power driving signal output means, in case that the first level signal is inputted from the power switch and at the same time the computer is being on power-off, outputs power-off signal through the data output means, in case that the first level signal is inputted from the power switch and at the same time the computer is being on power-on, and outputs pulse signal to the power driving signal output means according to power-off signal inputted through the data input means.

3. The power on/off control device for computer as claimed in claim 1, wherein the microprocessor outputs pulse signal to the power driving signal output means, in case that the first level signal is inputted from the power switch when the computer is being on power-on for longer than a first predetermined time.

4. The power on/off control device for computer as claimed in claim 3, wherein the microprocessor checks again the signal level of the first input port to perform the power on/off function after a predetermined second time, shorter than the first time, in case that the first input port is the first level.

5. The power on/off control device for computer as claimed in claim 4, wherein the second time is counted after the first time is terminated.

6. A power on/off control device for computer, having a first power supply means for outputting predetermined first electric power upon receiving input power and a second power supply means for outputting main electric power to operate the computer being on power-on, which is turned on and off according to power driving signals of a first level or a second level, comprising:

a remote controller for turning on and off the computer, apart more than a predetermined distance from the computer;

a power driving signal output means for outputting power driving signals of first level or second level alternatively according to pulse signals inputted from the microprocessor;

said microprocessor, having a first port for inputting remote control signal received from the remote controller and a second port connected with output port of the power driving signal output means, performing power on/off control according to signal data received from the first port and signal levels from the second port;

a data output means for forwarding data outputted from the microprocessor to a system data bus; and a data input means for sending data inputted through the system data bus to the microprocessor, the microprocessor detects on/off status of computer according to signal levels inputted through the second port and outputs pulse signals to the power driving output means according to signal data inputted through the first port and command data from the data input means.

7. The power on/off control device for computer as claimed in claim 6, wherein the microprocessor outputs pulse signal to the power driving signal output means, in case that power on/off data is inputted from the first port and at the same time the computer is being on power-off, outputs power-off signal through the data output means, in case that power on/off data is inputted from the first port and at the same time the computer is being on power-on, and outputs pulse signals to the power driving signal output means according to power-off signal inputted through the data input means.

* * * * *